Patented Jan. 2, 1945

2,366,525

UNITED STATES PATENT OFFICE 2,366,525

COMPOSITIONS OF MATTER AND METHODS AND STEPS OF MAKING AND USING THE SAME

Mortimer T. Harvey, East Orange, and William F. Schaufelberger, Orange, N. J., assignors, by direct and mesne assignments, to Harvel Research Corporation, a corporation of New Jersey No Drawing. Application December 21, 1940, Serial No. 371,142

4 Claims. (Cl. 202—52)

The present invention relates to methods of treating soya-bean oil to change its nature from that in which it has a non-drying characteristic to a state in which it has a drying characteristic and has a heavier body and higher viscosity than has the soya-bean oil before treatment by the method of the present invention, and the present invention further relates to the modified soya-bean oil after the treatment according to the present invention.

According to the present invention soya-bean oil is distilled at a reduced pressure to remove a substantial part of its weight as a distillate and to leave a residue. The distillate, for the most part is palmitic acid and stearic acid and their anhydrides and mixed anhydrides which are produced as a result of the destructive distillation of the glycerol palmitate and glycerol stearate, which latter are part of the natural content of soya-bean oil. The residue of this distillation method increases in viscosity as the period of distillation is increased, for any given distillation temperature and pressure, so that, as co-relevant facts, it can be stated that the greater the amount of glycerol palmitate and glycerol stearate removed the higher is the viscosity of the residue. And when a substantial part of the glycerol palmitate and stearate have been removed by the method of present invention the residue commences to assume a drying characteristic which is effective in the use of said residue as a drying oil in varnishes, paints, impregnations and molding compounds. The distillation can be carried on to a point where substantially all of the glycerol palmitate and stearate have been removed which means distilling off between about ten per cent and about twenty per cent of the total weight of the soya-bean oil which was the starting material. And at certain temperatures and pressures below atmospheric some of the other organic acid glycerides naturally occurring in soya-bean oil can come off and be destroyed to leave the corresponding organic acid or anhydride. And as high as thirty-five per cent of the original mass, by weight, of the soya-bean oil starting material can be distilled off by the method of the present invention to obtain various residues of desired predetermined viscosity and drying rates to serve various uses. The residues of the present invention have viscosities and drying characteristics not present in a mere mixture which represents the organic acid glycerides of soya-bean oil minus the glycerol palmitate and stearate naturally occurring therein. The effects of the method of the present invention in changing soya-bean oil from the non-drying condition to a drying condition begin to be apparent when the distillation pressure used is down to about 250 millimeters of mercury and the distillation temperature of this pressure can be between about 500° F. and 700° F., for example. Also distillation pressure lower than 250 mm. of mercury can be used and the distillation pressure can be as low as is practical with laboratory or commercial apparatus, that is, for example, as low as ten millimeters of mercury.

An object of the present invention is to remove the palmitic acid glyceride constituent of soya-bean oil and to produce a thickened or bodied residue which has drying characteristics and other desirable characteristics not found in soya-bean oil.

Other objects and advantages of the present invention will be apparent from this specification and the accompanying claims forming part hereof.

The following are given as illustrative examples of the vacuum distillation of soya-bean oil according to the present invention, together with a description of the products obtained thereby.

*Example 1.*—A given quantity of soya-bean oil was distilled at a reduced pressure of about 25 millimeters of mercury at about 625° F. to about 650° F. to remove about nineteen per cent of the starting material. The distillation condensate was a liquid of about the same color as the soya-bean oil starting material and by weight was sixteen per cent of the starting material. The distillation residue was a sticky gel of about the same color as the starting material and condensate (yellowish brown) and had drying characteristics suitable for use in making varnishes, paint vehicles, impregnations, moldings and so on.

*Example 2.*—A quantity of soya-bean oil was distilled under the conditions given above in Example 1, but the distillation was stopped when about ten per cent of the weight of the starting material was removed.

*General examples.*—Several batches of soya-bean oil were distilled under the conditions of Example 1, but distillation was discontinued in the several batches to obtain distillation residues left when twelve, fourteen and sixteen per cent of the starting material, respectively, was removed.

With the batch from which ten per cent were removed the residue was a thickened liquid and with the batch from which sixteen per cent were removed the residue was very heavy in body and with the batches representing removal of twelve and fourteen per cent the residues were correspondingly thick in relative proportion to the amount of starting material removed.

Having thus described our invention, what we claim and desire to protect by Letters Patent is:

1. The method which comprises distilling soya-bean oil at a temperature between about 500° F. and about 700° F. and at a reduced pressure ranging downwardly from about 250 millimeters of mercury until the quantity by weight of the distillate removed therefrom measures between about 10% to about 35% of the original mass by weight.

2. The method which comprises distilling soya-bean oil at a temperature between 625° F. and 650° F. and at a reduced pressure ranging downwardly from about 250 millimeters of mercury until the quantity by weight of the distillate removed therefrom measures between about 10% to about 35% of the original mass by weight.

3. The residue obtained by distilling soya-bean oil at a temperature between 500° F. and about 700° F. and at a reduced pressure ranging downwardly from about 250 millimeters of mercury until the quantity by weight of the distillate measures between 10% to about 35% of the original mass by weight.

4. The residue obtained by distilling soya-bean oil at a temperature between 625° F. and 650° F. and at a reduced pressure ranging downwardly from about 250 millimeters of mercury until the quantity by weight of the distillate measures between 10% to about 35% of the original mass by weight.

MORTIMER T. HARVEY.
WILLIAM F. SCHAUFELBERGER.